United States Patent
Kikuchi

(10) Patent No.: US 6,918,675 B2
(45) Date of Patent: Jul. 19, 2005

(54) MIRROR DRIVE UNIT

(75) Inventor: Akito Kikuchi, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 10/646,170

(22) Filed: Aug. 22, 2003

(65) Prior Publication Data

US 2004/0047054 A1 Mar. 11, 2004

(30) Foreign Application Priority Data

Sep. 11, 2002 (JP) .......................... 2002-265628

(51) Int. Cl.⁷ .................. G02B 7/198; B60R 1/06; B60R 1/07; B60R 1/072; G05D 3/00
(52) U.S. Cl. .................. 359/877; 359/873; 318/663
(58) Field of Search .................. 318/663, 648; 359/873

(56) References Cited

U.S. PATENT DOCUMENTS 6,254,424 B1 * 7/2001 Murakami et al. ........... 439/489
6,412,960 B1 * 7/2002 Yoshida et al. ............... 359/843
6,650,080 B1 * 11/2003 Guttenberger ............... 318/663

FOREIGN PATENT DOCUMENTS

| JP | 08-106837 A | * | 4/1996 |
| JP | 10-157519 | | 6/1998 |
| JP | 11-255028 A | * | 9/1999 |
| JP | 2000-142224 | * | 5/2000 |
| JP | 2000-157391 A | * | 6/2000 |
| JP | 2002-67799 | | 3/2002 |

* cited by examiner

Primary Examiner—John Juba, Jr.
(74) Attorney, Agent, or Firm—Brenda O. Holmes; Kilpatrick Stockton LLP

(57) ABSTRACT

An angle detection unit is provided with a pair of arms (temporary fixing mechanism) for temporarily fixing the angle detection unit to a power unit. The arms are fit to a cylinder portion (engagement portion) of the power unit in a manner of holding the cylinder portion. Thus, a mirror drive unit can be easily combined to a mirror housing without increasing the number of parts.

5 Claims, 10 Drawing Sheets

MIRROR DRIVE UNIT

BACKGROUND OF THE INVENTION

1. Field of the Invention

The present invention relates to a mirror drive unit used for a power mirror for vehicles or the like.

2. Description of the Related Art

A power door mirror for vehicles includes a mirror drive unit which changes a mirror surface angle of a mirror fixed to a mirror holder. In the mirror drive unit, a mirror holder is tiltably supported by a power unit fixed inside a mirror housing, and a ball-shaped end of an advancing/retracting rod, which is projected from and retracted into the power unit, is fitted into a ball-shaped socket portion of the mirror holder (see Japanese Patent application Laid-Open Publication No. 2002-67799).

In the mirror drive unit of this type, as disclosed in Japanese Patent application Laid-Open Publication No. Hei 10(1998)-157519, an angle detection unit is added for detecting the mirror surface angle of the mirror. This angle detection unit is fixed to the power unit by being fastened on the mirror housing together with the power unit.

However, with the structure where the angle detection unit and the power unit are fastened together on the mirror housing like the above-mentioned a conventional technology, the power unit and the angle detection unit were screwed on the mirror housing while being individually held by hand, so that assembly work thereof was complicated. Meanwhile, when a structure where the angle detection unit is previously screwed on the power unit is employed to facilitate the assembly work, the number of parts (the number of screws) is increased, thus increasing costs.

SUMMARY OF THE INVENTION

The present invention was made in the light of such conventional technologies. The present invention provides a mirror drive unit capable of being easily combined to the mirror housing without increasing the number of parts.

The present invention provides a mirror drive unit including a power unit disposed in a mirror housing, a mirror holder tiltably supported by the power unit through a joint, and an angle detection unit disposed in the power unit, the angle detection unit detecting a tilt angle of the mirror holder. The angle detection unit is provided with a temporary fixing mechanism for temporarily fixing the angle detection unit to the power unit, and the angle detection unit can be fixed to the power unit in a state where the angle detection unit is temporarily fixed to the power unit.

According to the present invention, since the angle detection unit is provided with the temporary fixing mechanism for temporarily fixing the angle detection unit to the power unit, the angle detection unit can be easily fixed to the power unit. Accordingly, the mirror drive unit of the present invention can be easily combined to the mirror housing without increasing the number of parts.

The power unit may include an engagement portion projected from the power unit. The temporary fixing mechanism may include a pair of arms, which is projected from a body of the angle detection unit and holds the engagement portion of the power unit between the arms and the body of the angle detection unit.

With this constitution, the temporary fixing mechanism can be simply constructed.

The engagement portion may be formed of a cylinder portion, which is projected from a front face of the power unit and provided with an inner peripheral surface slidingly guiding tilting of the mirror holder.

With this constitution, tilting of the mirror holder is slidingly guided by the inner peripheral surface of the cylinder portion, so that vibration added to the mirror holder can be reduced. Moreover, stress added to the mirror holder can be distributed.

The power unit may include a rotation stopper which prevents the angle detection unit from rotating around the cylinder portion by abutting on distal ends of the arms of the angle detection unit.

With this constitution, the angle detection unit temporarily fixed to the power unit is firmly positioned, thus further facilitating combining work to the mirror housing.

The angle detection unit may include claws. In a state where the angle detection unit is temporarily fixed, the claws abut on a rear face of the power unit and hold the power unit between the claws and the arms abutting on the front face of the power unit.

With this constitution, the engagement portion (cylinder portion) projected from the front face of the power unit is sandwiched by the pair of arms and the power unit is sandwiched between the arms and the claws at the front and rear faces, so that the angle detection unit is difficult to drop off from the power unit. Moreover, the angle detection unit to be temporarily fixed to the power unit is more firmly positioned, thus further facilitating the combining work to the mirror housing.

DETAILED DESCRIPTION OF THE PREFERRED EMBODIMENT

Figure 1:
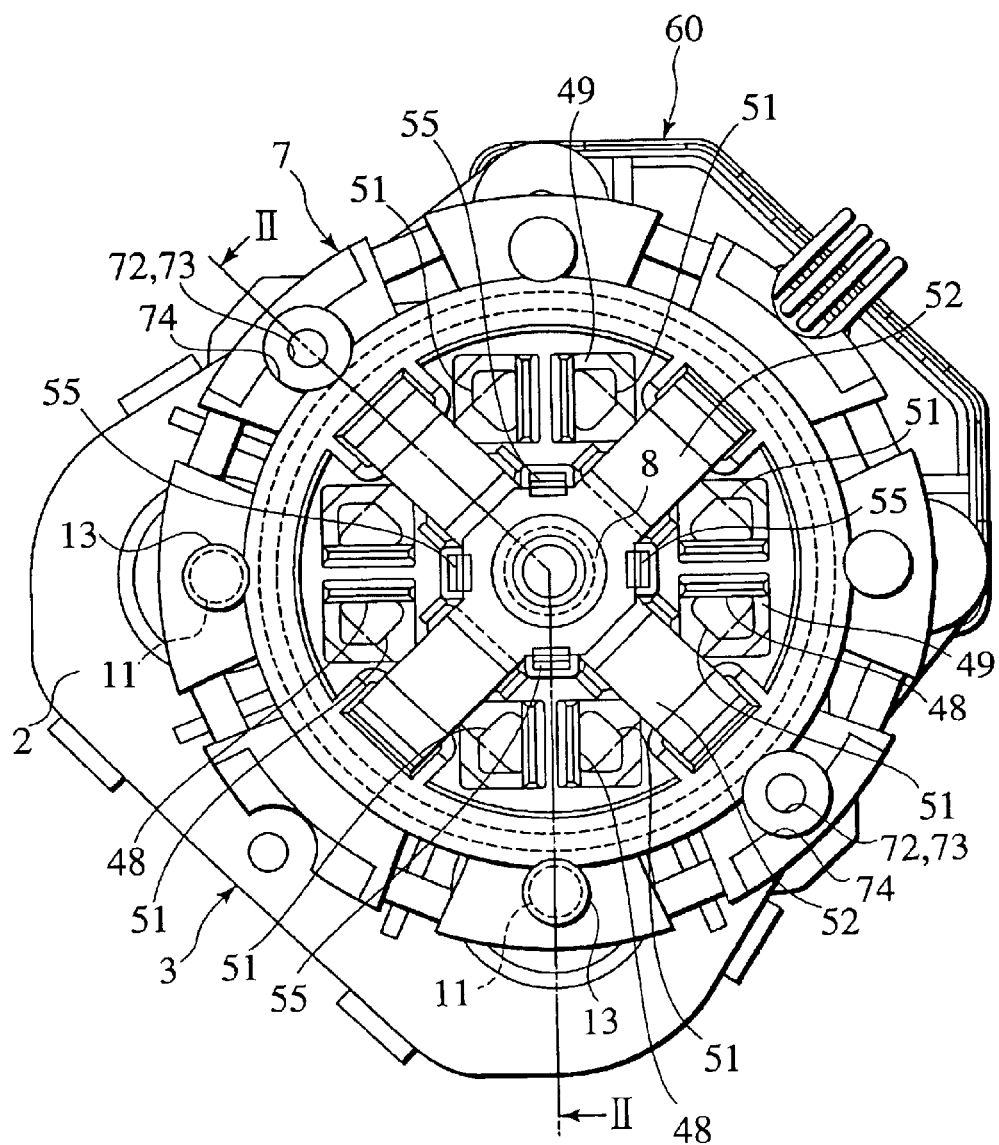
FIG. 1 is a rear view showing a mirror drive unit according to a preferred embodiment of the present invention.

A preferred embodiment of the present invention will now be described with reference to the drawings. A mirror drive unit of this embodiment is an example applied to a door mirror of a vehicle. Hereinafter, the description will be given by taking as an example a mirror drive unit attached to a right door mirror.

Basic Structure of Mirror Drive Unit (FIGS. 1 to 4)

The mirror drive unit includes a flat power unit 3, a mirror holder 7, and an angle detection unit (potentiometer) 60. The power unit 3 is fixed in a mirror housing (not shown). The mirror holder 7 is tiltably supported by the power unit 3 through a ball-and-socket joint. The angle detection unit 60 is attached and fixed to the power unit 3 and detects a tilt angle of the mirror holder 7.

Structure of Power Unit 3 (FIGS. 1 to 7)

A case of the power unit 3 is formed of a lower case 1 and an upper case 2. Three hooks 18 formed in the lower case 1 are engaged with protrusions 19 formed in the upper case 2 to keep the case airtight. A pivot shaft 6 with a ball-shaped end is uprightly provided in a center of a front face of the upper case 2. A socket portion 8 formed in a center of the mirror holder 7 is rotatably fit into the end of the pivot shaft 6. In other words, the ball-and-socket joint includes the ball-shaped end of the pivot shaft 6 and the socket portion 8. A mirror 9 (shown by a chain double dashed line in FIG. 2) is attached to the mirror holder 7, and the mirror holder 7 tilts around the pivot shaft 6 together with the mirror 9.

The case accommodates two motors 4 as driving means and two advancing/retracting rods 11. Each of the advancing/retracting rods 11 is projected from and retracted into an opening 10 of the case by a driving force of the motor 4 through a drive transmission mechanism (a drive shaft 29, a helical gear 5, an inner screw 26 of a guide cylinder 25, a spring 41, and the like). The advancing/retracting rods 11 can be independently projected or retracted. When one (left one in FIG. 1) of the advancing/retracting rods 11 is projected and retracted, the angle of the mirror holder 7 (mirror 9) can be changed in a vertical direction. When the other advancing/retracting rod 11 (lower one in FIG. 1) is projected and retracted, the angle of the mirror holder 7 (mirror 9) can be changed in a horizontal direction. Accordingly, a driver can optimally adjust the orientation of the mirror 9 based on his/her own height or a direction of his/her eyes.

Figure 2:
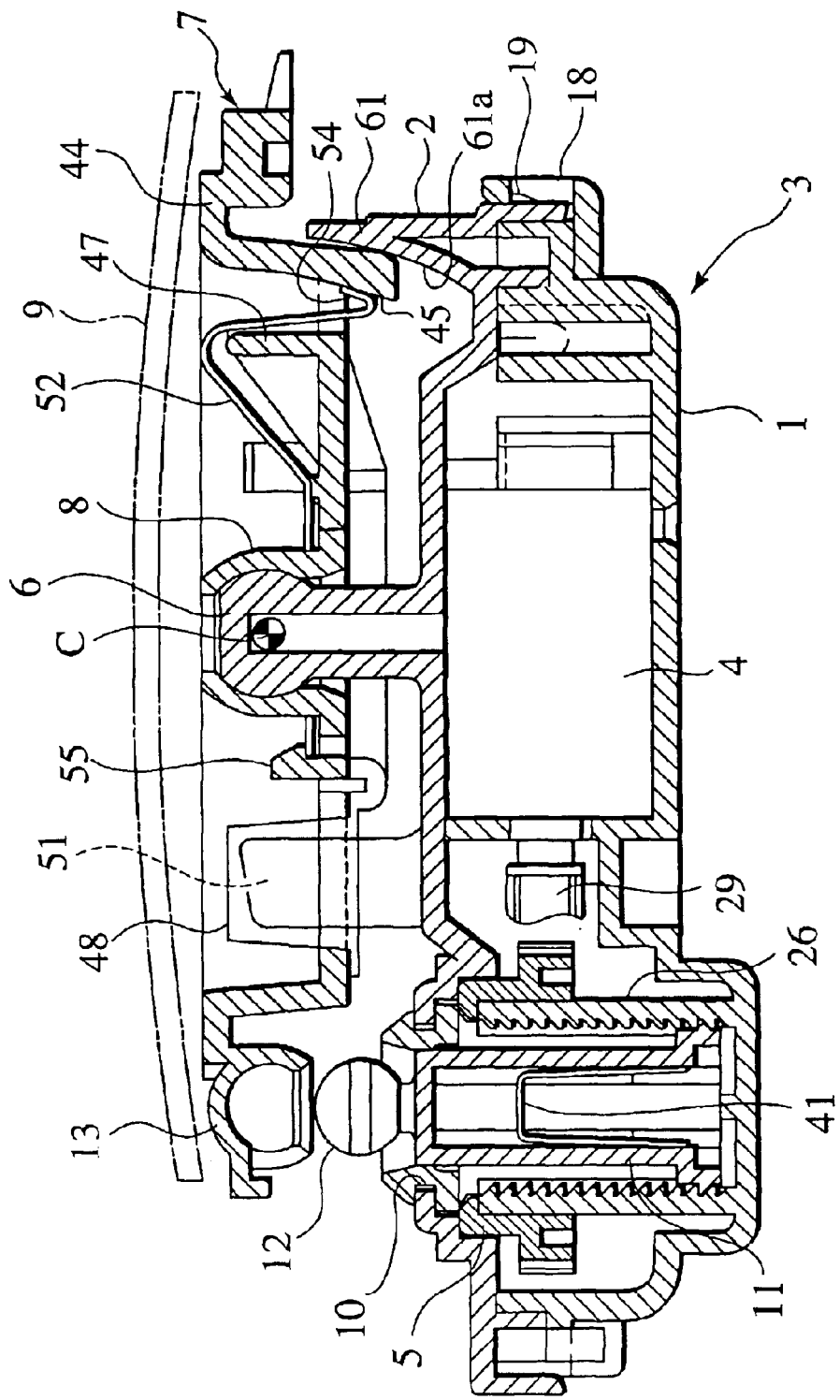
FIG. 2 is a sectional view taken along a line II-II in FIG. 1.
Figure 3:
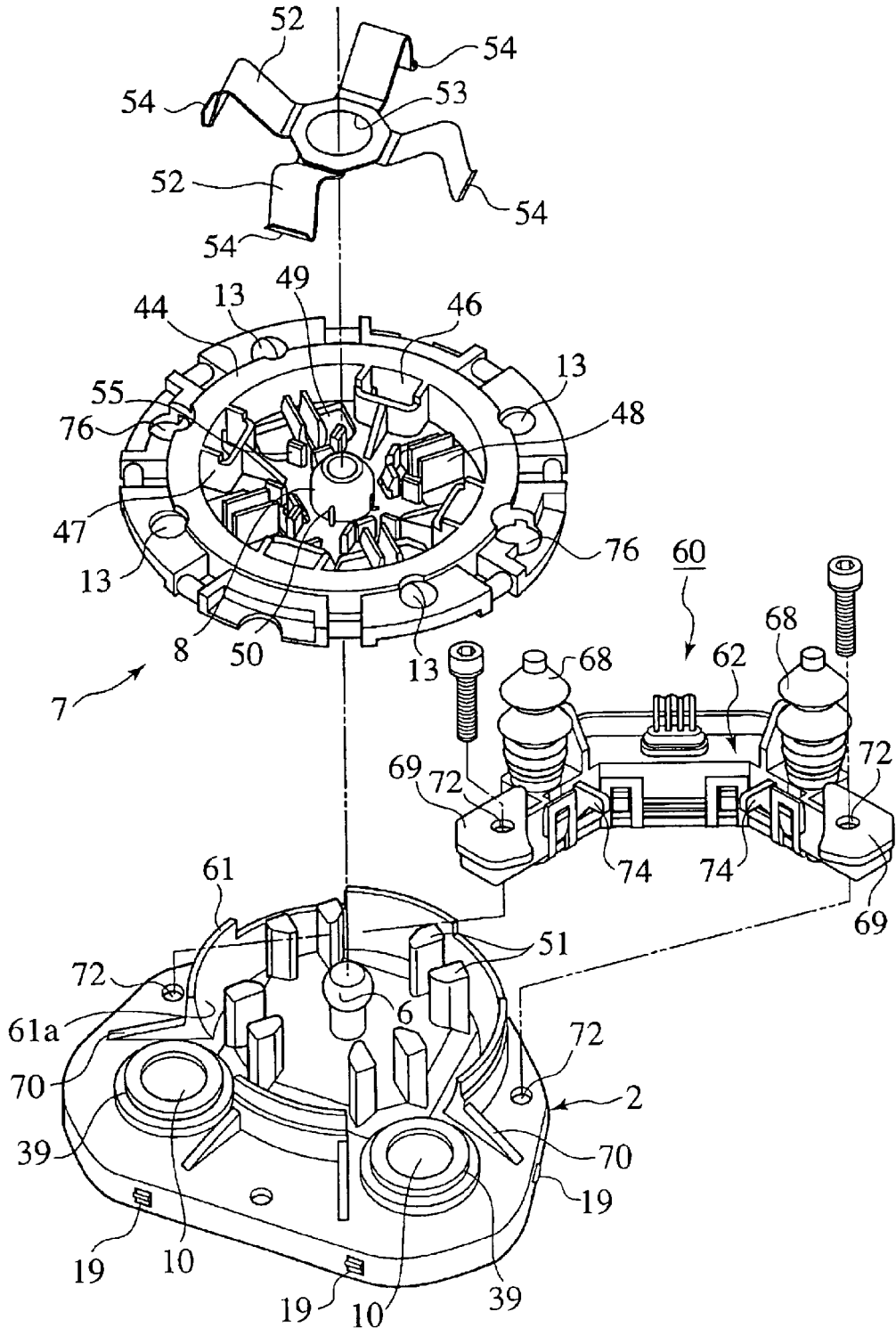
FIG. 3 is an exploded perspective view showing an upper case, an angle detection unit, a mirror holder, and a leaf spring of a power unit of FIG. 1.
Figure 4:
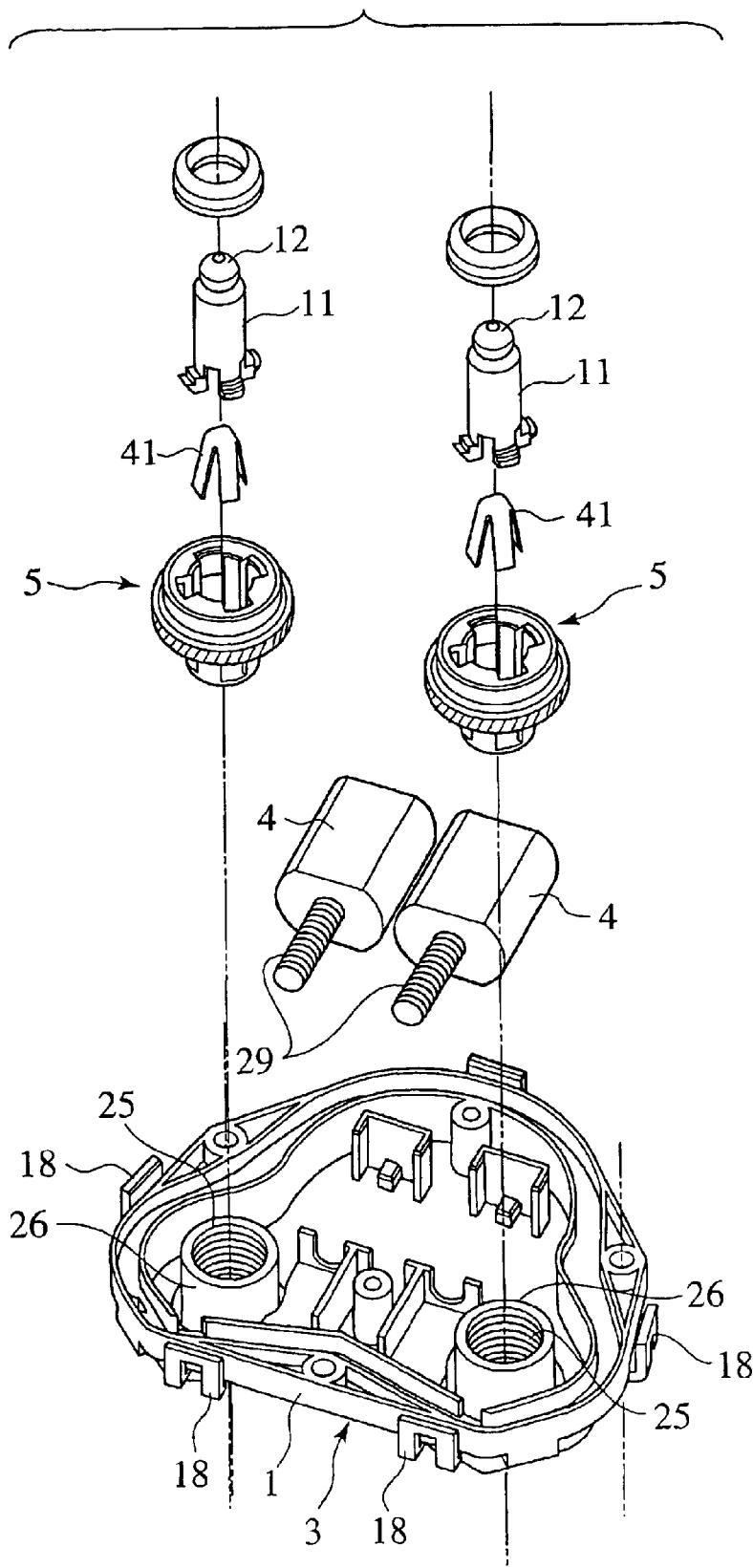
FIG. 4 is an exploded perspective view showing a lower case of the power unit of FIG. 1 and drive parts to be built therein.

Structure of Mirror Holder 7 (FIGS. 1 to 3)

The mirror holder 7 is substantially shaped into a disk as a whole. The mirror holder 7 is concaved in a center portion thereof. In the center thereof, the socket portion 8 which receives the pivot shaft 6 formed in the power unit 3 is projected, and the mirror holder 7 tilts around the socket portion 8.

The socket portion 8 has a spherical inner surface fitting for the pivot shaft 6 and has an opening at the foot thereof, a diameter of which is smaller than the maximum diameter of the pivot shaft 6. At the foot of this socket portion 8, four slits 50 (FIG. 3) are longitudinally formed. The socket portion 8 is attached to the ball-shaped end of the pivot shaft 6 while the foot of the socket portion 8 is forced to spread.

Two leaf springs 52 are attached in cross shape on the socket portion 8 attached to the pivot shaft 6. Each leaf spring 52 is provided with a round hole 53 having a diameter corresponding to an outer diameter of the foot of the socket portion 8. Putting these round holes 53 on the socket portion 8 from above restricts the spread of the foot of the socket portion 8, and prevents the pivot shaft 6 fit into the socket portion 8 from being detached from the socket portion 8. In addition, the leaf springs 52 themselves are engaged with claw portions 55 formed on the periphery of the socket portion 8 and prevented from being detached from the socket portion 8.

At positions corresponding to ball-shaped socket portions 13 which fit to the advancing/retracting rods 11, elastic portions 48 are integrally formed. Each of the elastic portions 48 includes a pair of elastic pieces, each having a substantially V-shaped cross section and a predetermined height. On both sides of each elastic portion 48, independent openings 49 are provided. On the other hand, four pairs of position control members 51 spaced a certain distance apart are formed around the pivot shaft 6 of the upper case 2. The mirror holder 7 is attached to the power unit 3 such that each of the elastic portions 48 having a substantially V-shaped cross section is located between the paired position control members 51. Accordingly, the mirror holder 7 is prevented from moving in a rotational direction around the pivot shaft 6, and the mirror holder 7 is only allowed to tilt around the ball-shaped end of the pivot shaft 6.

Both end sides of each leaf spring 52 are bent in a V shape so as to bridge flanges 47 surrounding openings 46. At both ends of the leaf spring 52, folded portions 54 are formed. The folded portions 54 are brought into elastic contact with extension portions 45 extending from the openings 46 of the holder base 7 toward the power unit 3 side. Accordingly, tension of the leaf springs 52 affects the entire mirror holder 7, thus preventing vibration of the mirror holder 7 and improving visibility of the mirror 9.

Herein, in the front face of the upper case 2 of the power unit 3, a cylinder portion (engagement portion) 61 is projected around an axis of the pivot shaft 6. An inner peripheral surface 61a of the cylinder portion 61 is formed as a spherical concave surface around a tilt fulcrum C (core C of the ball-shaped end of the pivot shaft 6) of the mirror holder 7. The extension portions 45 of the holder base 7 are slidingly guided along the inner peripheral surface 61a to reduce vibration and stress added to the mirror holder 7.

Structure of Angle Detection Unit 60 (FIGS. 5 to 12)

This embodiment is characterized in that the angle detection unit 60 can be temporarily fixed to the power unit 3 in an assembly process so as to hold the cylinder portion 61 projected from the front face of the power unit 3. Hereinafter, a description will be given of a structure of the angle detection unit 60 in more detail.

Basic Structure of Angle Detection Unit 60 (FIGS. 8 to 12)

The angle detection unit 60 of this embodiment is a potentiometer. Note that the angle detection unit in the present invention may be an angle detection unit which electromagnetically detects an angle (see Japanese Patent Application Laid-Open Publication No. Hei 10(1998)-157519).

Figure 11:
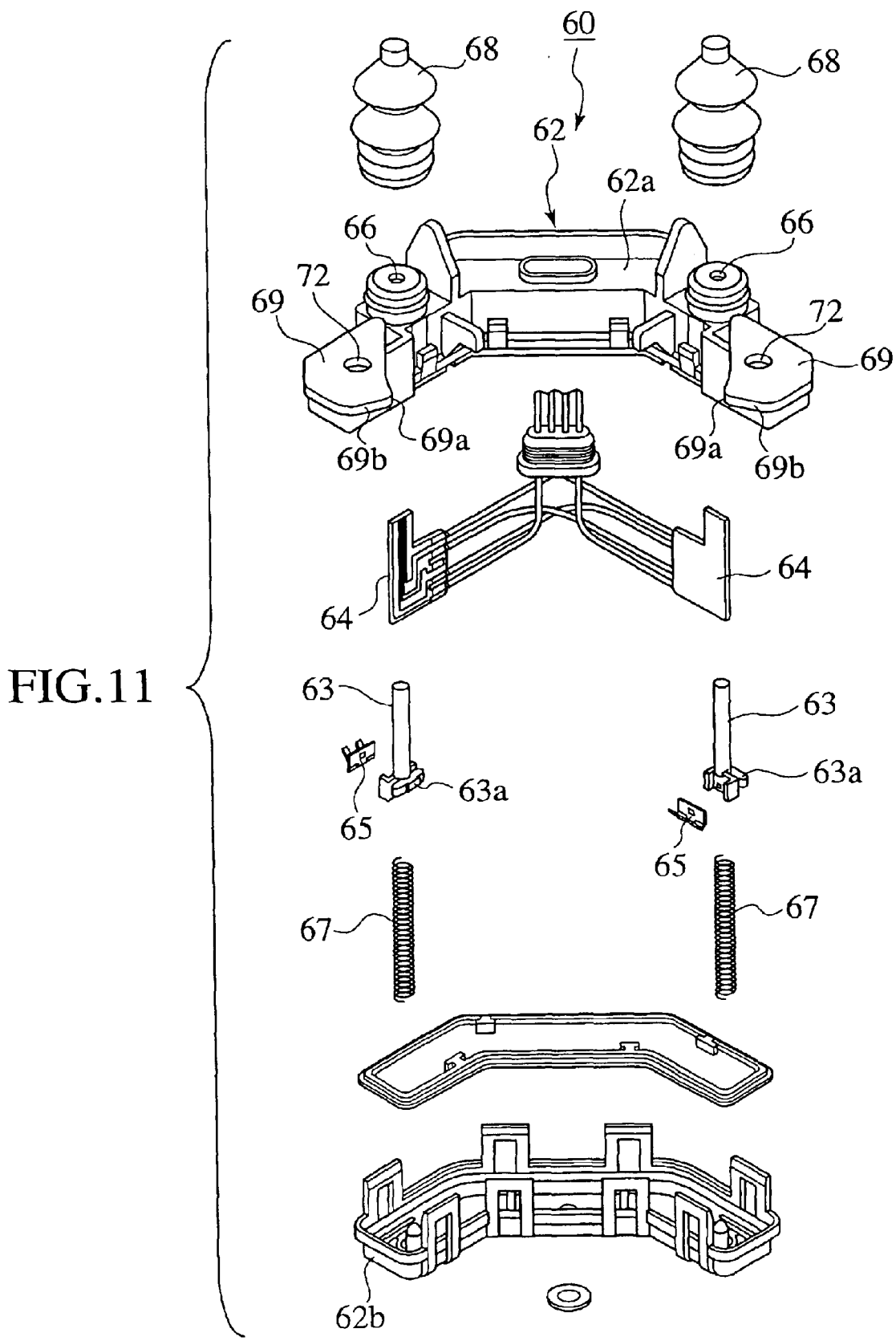
FIG. 11 is an exploded perspective view of the angle detection unit.

As shown in FIG. 11, the angle detection unit 60 includes a case 62 and projecting/retracting members 63, which are attached in the case 62 so as to be freely projected and retracted. The case 62 includes an upper case 62a and a lower case 62b, which are coupled with each other. The case 62 formed by coupling the upper and lower cases 62a and 62b accommodates printed circuit boards 64 and contacts 65. The contacts 65 are attached to proximal ends of the projecting/retracting members 63 and slide on the printed circuit boards 64. The projecting/retracting members 63 projected from openings 66 in a top face of the case 62 are prevented from dropping off from the case 62 by flanges 63a at the proximal ends of the projecting/retracting members 63. Between each flange 63a and a bottom face of the lower case 62b, a return spring 67 which energizes the projecting/retracting member 63 is provided to be compressed. The tips of the projecting/retracting members 63 are in contact with a rear face of the mirror holder 7, and the projecting/retracting members 63 are projected and retracted along with tilting of the mirror holder 7. Specifically, when the mirror surface moves downward by the advancing/retracting rods 11 of the power unit 3, each projecting/retracting member 63 abutted on the rear face of the mirror holder 7 is pressed into the case 62. On the other hand, when the mirror surface is recovered from the downward state and moves upward, the projecting/retracting member 63 is projected by an energizing force of the return spring 67. At this time, output voltage from the angle detection unit 60 changes in accordance with movement of the contact 65 attached to the projecting/retracting member 63. The mirror surface angle can be detected with a control circuit (not shown) based on the output voltage.

Figure 5:
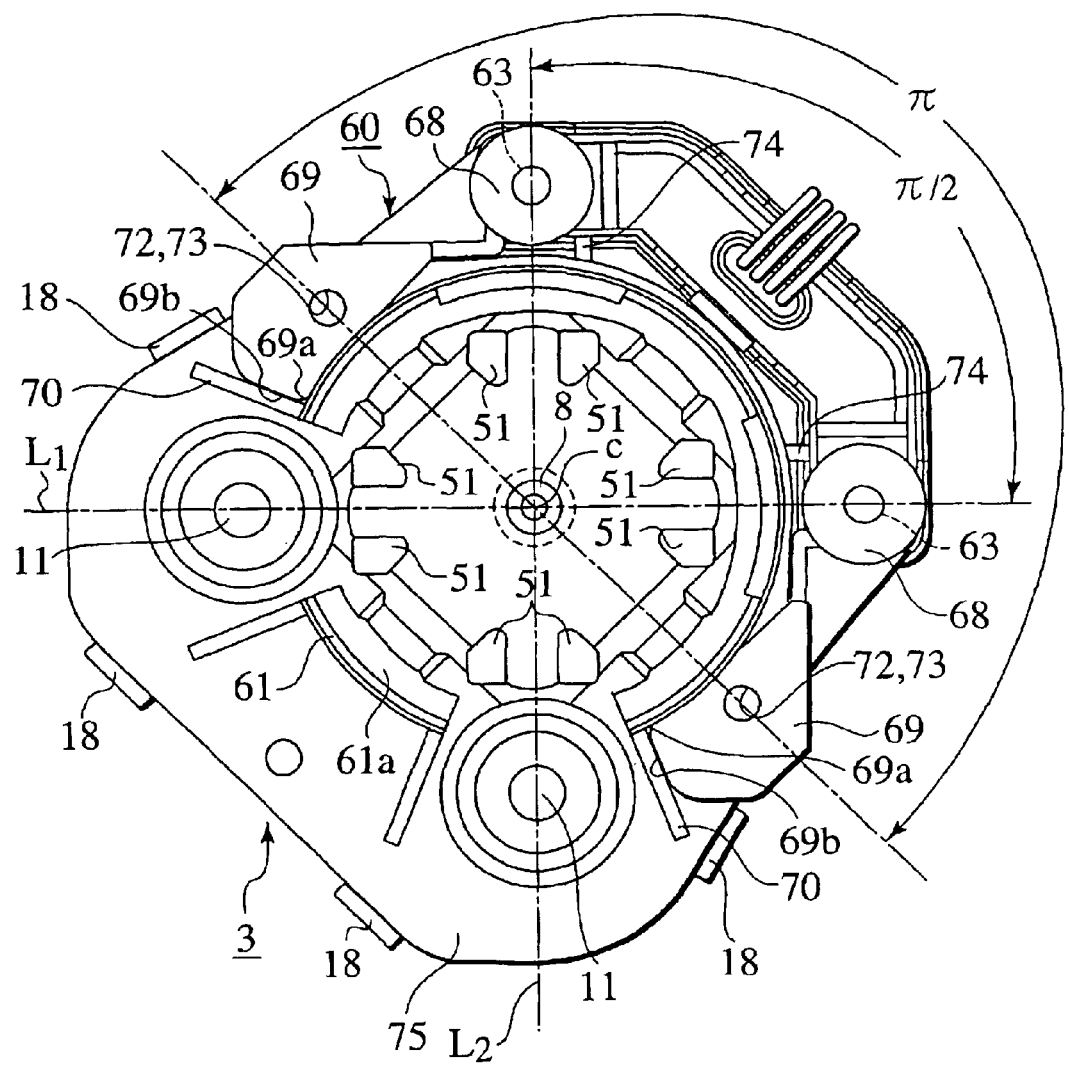
FIG. 5 is a rear view showing a state where the angle detection unit is temporarily fixed to the power unit.
Figure 6:
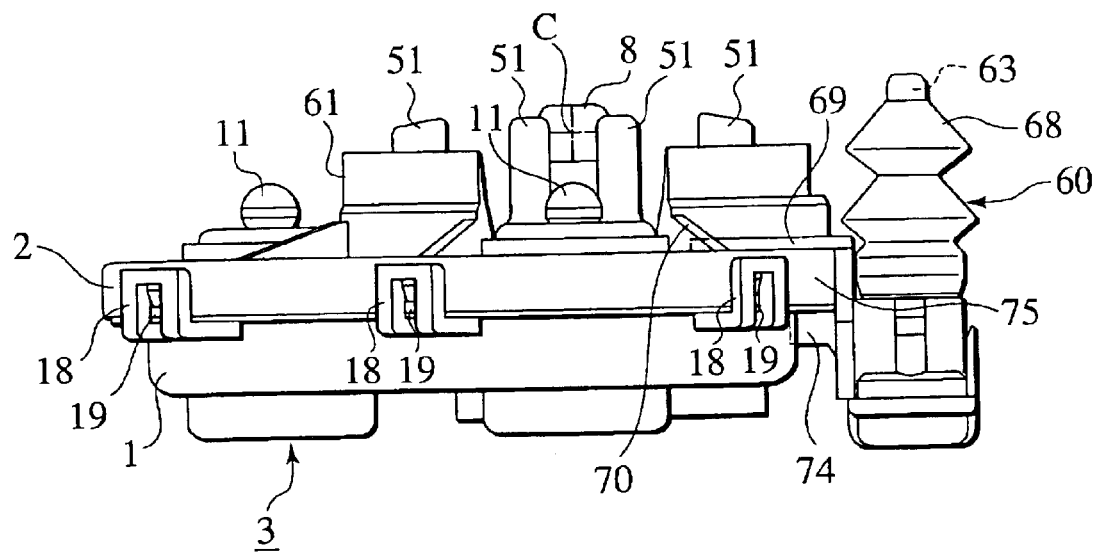
FIG. 6 is a bottom view showing the state where the angle detection unit is temporarily fixed to the power unit.
Figure 7:
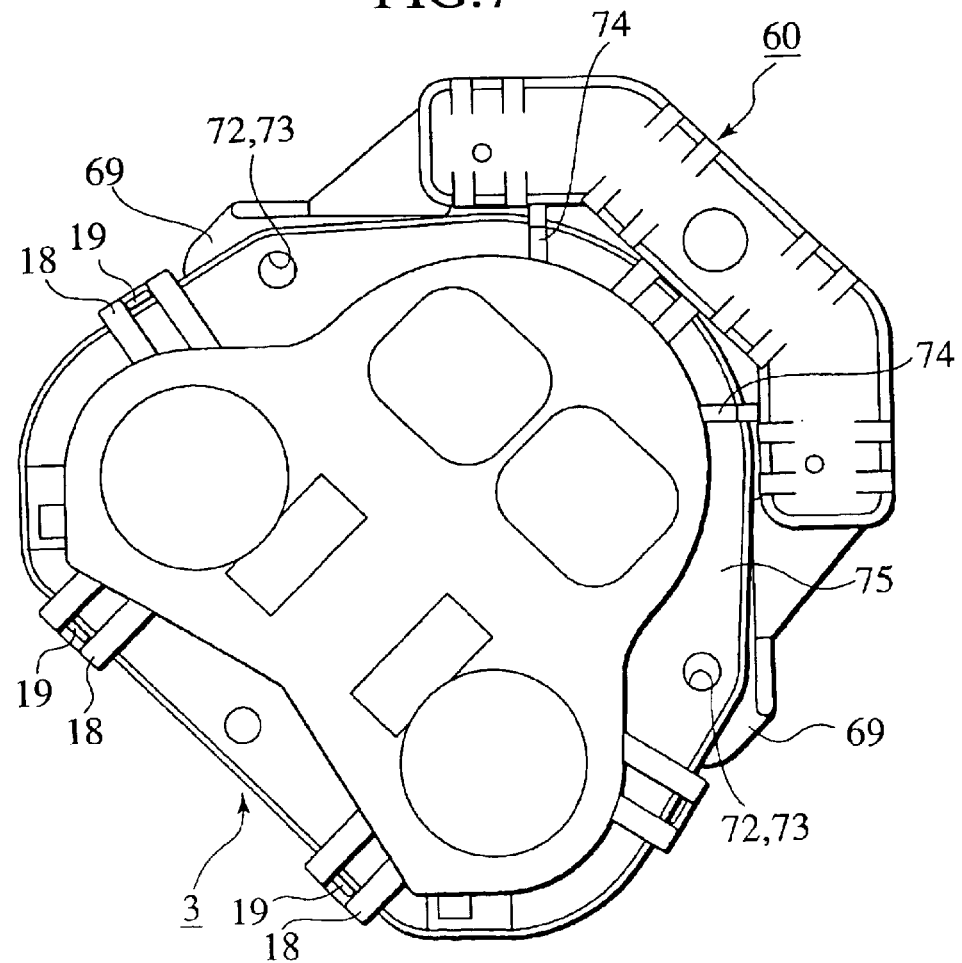
FIG. 7 is a front view showing the state where the angle detection unit is temporarily fixed to the power unit.
Figure 8:
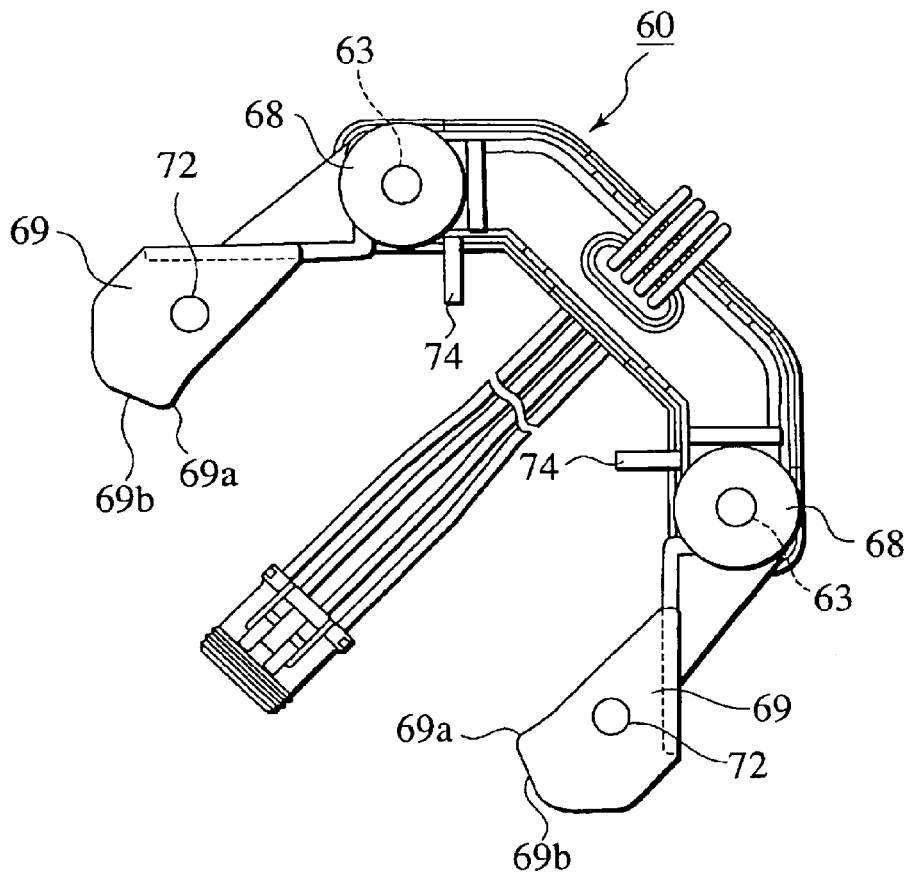
FIG. 8 is a rear view of the angle detection unit.
Figure 9:
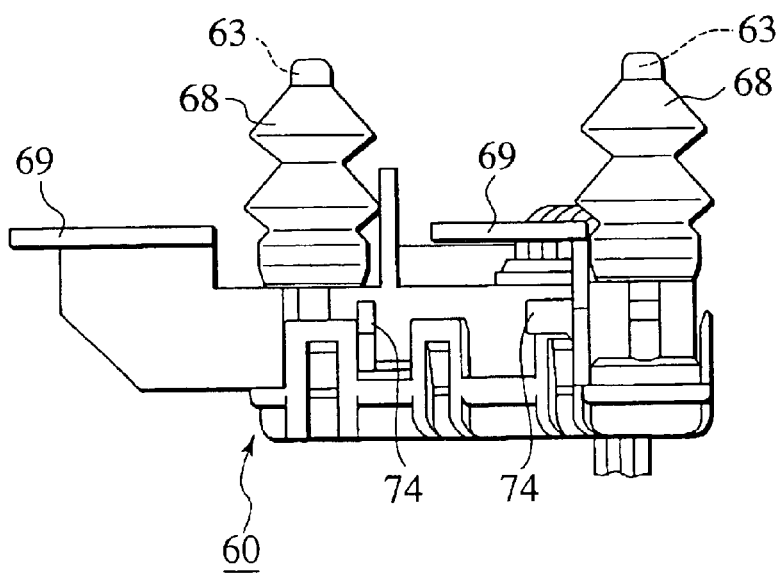
FIG. 9 is a bottom view of the angle detection unit.
Figure 10:
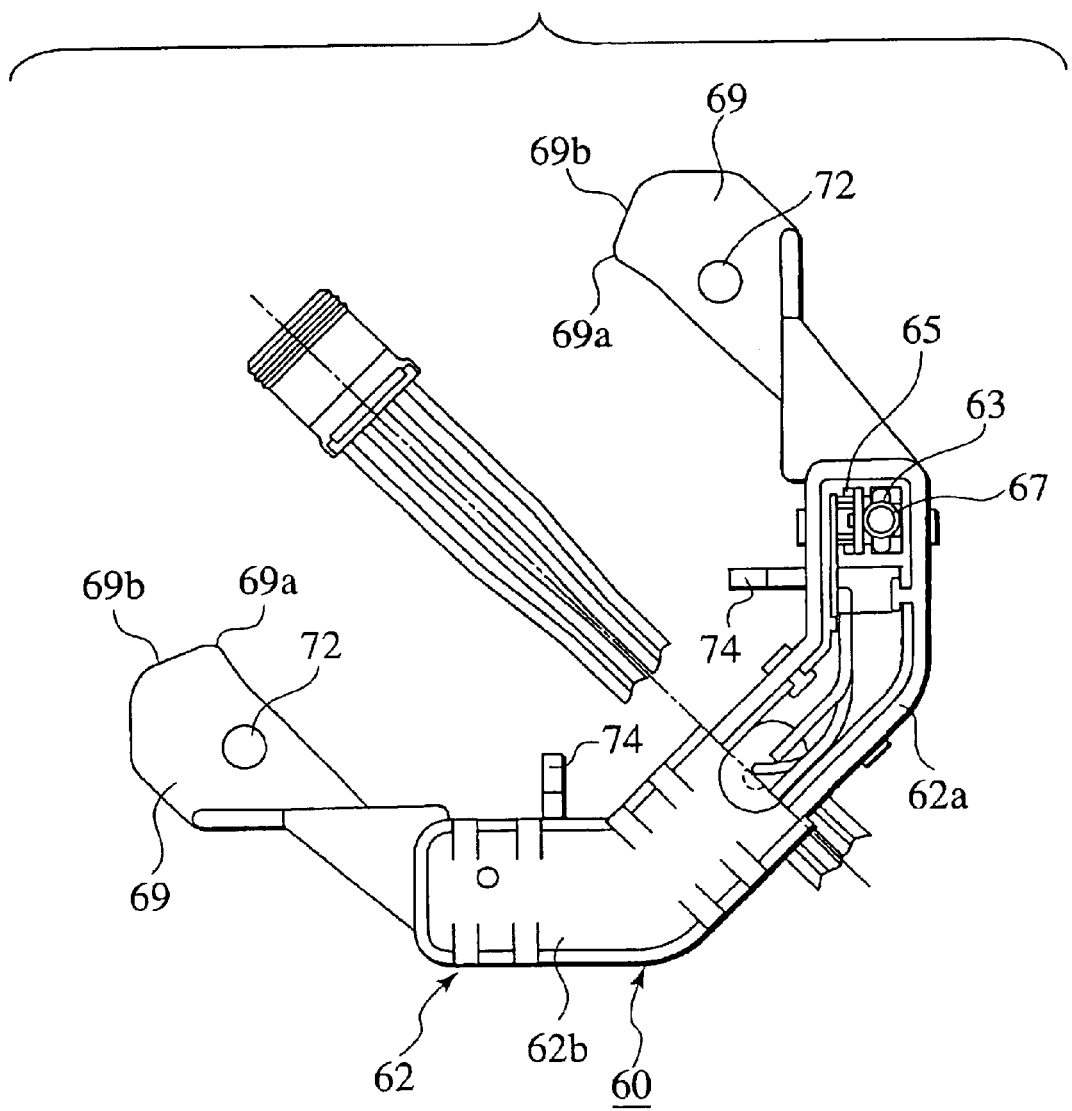
FIG. 10 is a partially cutaway front view of the angle detection unit.

In order to independently detect a vertical tilt angle and a horizontal tilt angle of the mirror holder 7 (mirror 9), as shown in FIG. 5, the projecting/retracting members 63 of the angle detection unit 60 are respectively located on extension lines L1 and L2 connecting the advancing/retracting rods 11 and the pivot shaft 6. In other words, the two projecting/retracting members 63 are located at positions spaced a quarter arc ($\pi/2$) apart around the pivot shaft 6. Accordingly, a body of the angle detection unit 60 is formed to be larger than at least the quarter arc. Incidentally, the reference numeral 68 in the drawing denotes grommets.

Temporary Fixed Structure of Angle Detection Unit 60 (FIGS. 5 to 7, FIG. 12)

Figure 12:
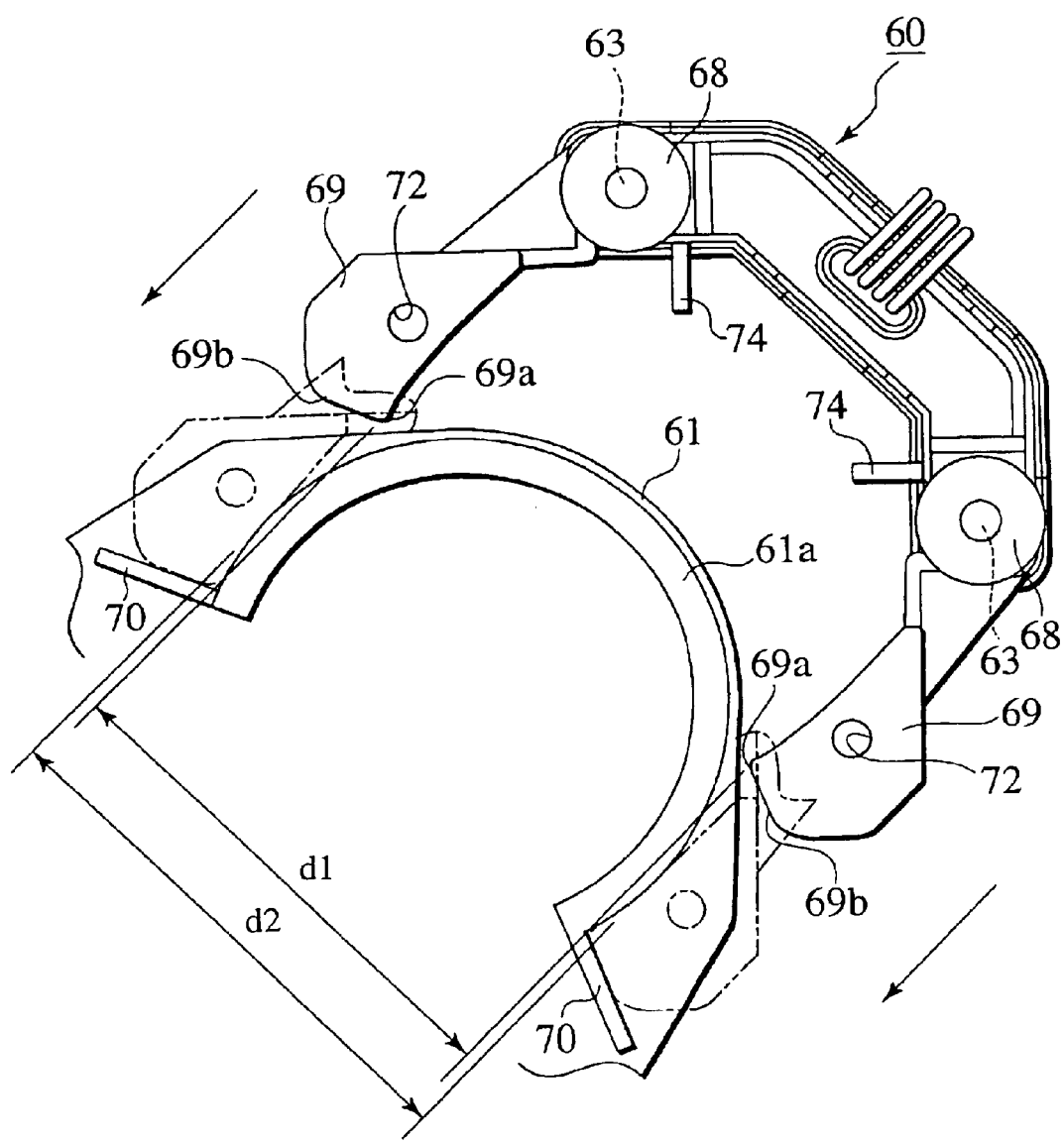
FIG. 12 is a schematic view showing a process of temporarily fixing the angle detection unit to the power unit.

Paired plate-shaped arms 69 as a temporary fixing mechanism are projected from both ends of the body of the angle detection unit 60. The angle detection unit 60 is shaped into a substantially semicircular arc around the pivot shaft 6 as a whole. Distal ends of the paired arms 69 are formed as constriction portions 69a, a distance d1 between which is set slightly smaller than a diameter d2 of the cylinder portion 61 as shown in FIG. 12. Therefore, as the cylinder portion 61 is inserted between the paired arms 69 while the paired arms 69 are slid along the front face of the power unit 3, the constriction portions 69a inside the distal ends of the arms 69 get over a maximum diameter part of the cylinder portion 61, and then the arms 69 fit around the cylinder portion 61 so as to hold the cylinder portion 61.

Herein, ribs 70 are extended from the cylinder portion 61 of the power unit 3. In a state where the angle detection unit 60 is temporarily fixed, distal end faces 69b of the arms 69 abut on the respective ribs 70, so that the angle detection unit 60 does not rotate around the cylinder portion 61. These ribs 70 are orthogonally projected from an outer peripheral surface of the cylinder portion 61 and serve as reinforcement for strength of the cylinder portion 61.

Each of the arms 69 is provided with a through hole 72. The through hole 72 corresponds to each through hole 73 of the power unit 3. The angle detection unit 60 is fastened to the mirror housing (not shown) together with the power unit 3 through the through holes 72, 73.

In addition, two claws 74 are projected from the inner side face of the body of the angle detection unit 60. In the state where the angle detection unit 60 is temporarily fixed, an outer peripheral thin wall portion 75 of the power unit 3 is held between the claws 74 and the arms 69. Therefore, in the state where the angle detection unit 60 is temporarily fixed, the angle detection unit 60 is firmly positioned in the power unit 3 by the following ways: 1) the cylinder portion 61 of the power unit 3 is held by the arms 69 of the angle detection unit 60; 2) rotation of the angle detection unit 60 is prevented by the ribs 70 of the power unit 3; and 3) the outer peripheral thin wall portion 75 of the power unit 3 is sandwiched by the arms 69 and the claws 74 of the angle detection unit 60.

Assembly Process

The mirror drive unit thus constituted is assembled as follows. First, the mirror holder 7 and the power unit 3 are put together. Specifically, the pivot shaft 6 of the power unit 3 is fit into the socket portion 8 of the mirror holder 7, and simultaneously, ball-shaped ends 12 of the advancing/retracting rods 11 of the power unit 3 are fit into the respective ball-shaped socket portions 13 of the mirror holder 7. At this time, the position control members 51 of the power unit 3 are inserted into the respective openings 49 of the mirror holder 7 to abut on the respective elastic portions 48 in the periphery of the openings 49.

Subsequently, as shown in FIG. 12, the paired arms 69 of the angle detection unit 60 are inserted from a small space between the power unit 3 and the mirror holder 7 to fit to the cylinder portion 61 of the power unit 3, and then the angle detection unit 60 is temporarily fixed to the power unit 3. At this time, the through holes 72 of the arms 69 of the angle detection unit 60 correspond to the respective through holes 73 of the power unit 3 and communicate with the front face side of the mirror holder 7 through the openings 76 of the mirror holder 7.

The mirror drive unit with the angle detection unit 60 temporarily fixed thereto is then attached and fixed to the mirror housing (not shown). Specifically, the through holes 72 and 73 are set at positions of bosses provided in an inner face of the mirror housing (not shown). Subsequently, a screwing jig (driver) is inserted from the openings 76 of the mirror holder 7, and the power unit 3 and the angle detection unit 60 are fastened to the mirror housing with screws through the through holes 72 and 73.

According to such a mirror drive unit of the embodiment, since the angle detection unit 60 is provided with the temporary fixing mechanism (arms 69) for temporarily fixing the angle detection unit 60 to the power unit 3, the angle detection unit 60 can be fixed to the power unit 3 in the state where the angle detection unit 60 is temporarily fixed to the power unit 3. Accordingly, the mirror drive unit of the embodiment can be easily combined to the mirror housing without increasing the number of parts.

According to the present invention, since the angle detection unit is provided with the temporary fixing mechanism for fixing the angle detection unit to the power unit, the angle detection unit can be fixed to the power unit in the state where the angle detection unit is temporarily fixed to the power unit. Accordingly, the mirror drive unit of the embodiment can be easily combined to the mirror housing without increasing the number of parts.

Japanese patent application No. 2002-265628 is incorporated herein by reference in its entirety.

What is claimed is:

1. A mirror drive unit, comprising:

a power unit disposed in a mirror housing;

a mirror holder tiltably supported by the power unit through a joint; and an angle detection unit disposed in the power unit, the angle detection unit detecting a tilt angle of the mirror holder, wherein the angle detection unit is provided with a temporary fixing mechanism for temporarily fixing the angle detection unit to the power unit, wherein the power unit includes an engagement portion projected from the power unit, wherein the engagement portion comprises a cylinder portion, which is projected from the power unit and includes an inner peripheral surface slidingly guiding tilting of the mirror holder, and wherein the temporary fixing mechanism includes a pair of arms, which is projected from a body of the angle detection unit and fitted to the engagement portion of the power unit in a manner of holding the cylinder portion.

2. The mirror drive unit according to claim 1, wherein the power unit is provided with rotation stoppers which prevent the angle detection unit from rotating around the cylinder portion by abutting the rotation stoppers on distal ends of the arms of the angle detection unit.

3. The mirror drive unit according to claim 2, wherein each of the rotation stoppers includes a rib orthogonally projected from an outer peripheral surface of the cylinder portion.

4. The mirror drive unit according to claim 1, wherein the angle detection unit includes claws, and in a state where the angle detection unit is temporarily fixed, the claws abut on a rear face of the power unit and hold the power unit between the claws and the arms abutting on a front face of the power unit.

5. The mirror drive unit according to claim 1, wherein the paired arms include distal ends, and a distance between the distal ends is slightly smaller than an outer diameter of the engagement portion.

* * * * *